United States Patent
Luo et al.

(10) Patent No.: US 10,978,693 B2
(45) Date of Patent: Apr. 13, 2021

(54) BATTERY PASTE, BATTERY ELECTRODE PLATE, AND PREPARATION METHOD THEREFOR

(71) Applicant: NINGBO INSTITUTE OF MATERIALS TECHNOLOGY AND ENGINEERING, CHINESE ACADEMY OF SCIENCES, Zhejiang (CN)

(72) Inventors: Hao Luo, Zhejiang (CN); Guanghua Yang, Zhejiang (CN); Zhaoping Liu, Zhejiang (CN)

(73) Assignee: NINGBO INSTITUTE OF MATERIALS TECHNOLOGY AND ENGINEERING, CHINESE ACADEMY OF SCIENCES, Zhejiang (CN)

( * ) Notice: Subject to any disclaimer, the term of this patent is extended or adjusted under 35 U.S.C. 154(b) by 130 days.

(21) Appl. No.: 16/310,355

(22) PCT Filed: Aug. 26, 2016

(86) PCT No.: PCT/CN2016/096922
§ 371 (c)(1),
(2) Date: Dec. 14, 2018

(87) PCT Pub. No.: WO2017/215121
PCT Pub. Date: Dec. 21, 2017

(65) Prior Publication Data
US 2019/0157661 A1 May 23, 2019

(30) Foreign Application Priority Data
Jun. 15, 2016 (CN) .......................... 201610427469.2

(51) Int. Cl.
| H01M 4/1391 | (2010.01) |
| H01M 10/0525 | (2010.01) |
| H01M 4/1393 | (2010.01) |
| H01M 4/62 | (2006.01) |
| H01M 4/139 | (2010.01) |
| H01M 4/13 | (2010.01) |
| H01M 4/1395 | (2010.01) |

(52) U.S. Cl.
CPC ........... H01M 4/1391 (2013.01); H01M 4/13 (2013.01); H01M 4/139 (2013.01); H01M 4/1393 (2013.01); H01M 4/1395 (2013.01); H01M 4/62 (2013.01); H01M 4/622 (2013.01); H01M 10/0525 (2013.01)

(58) Field of Classification Search
CPC .... H01M 4/13; H01M 4/1391; H01M 4/1393; H01M 4/62; H01M 10/0525
See application file for complete search history.

(56) References Cited

U.S. PATENT DOCUMENTS

| 2004/0023118 A1* | 2/2004 | Kinoshita ............. H01M 4/364 429/232 |
| 2010/0035146 A1 | 2/2010 | Fujii |
| 2014/0072862 A1 | 3/2014 | Saito et al. |
| 2015/0004481 A1* | 1/2015 | Iwahori ............. H01M 10/0525 429/188 |
| 2015/0207173 A1* | 7/2015 | Onizuka ........... H01M 10/0413 429/94 |
| 2016/0013517 A1 | 1/2016 | Nakazawa |
| 2016/0141720 A1 | 5/2016 | Onozaki |

FOREIGN PATENT DOCUMENTS

| CN | 101651233 A | 2/2010 |
| CN | 101867037 A | 10/2010 |
| CN | 102738446 A | 10/2012 |
| CN | 103346347 A | 10/2013 |
| CN | 103682449 A | 3/2014 |
| CN | 104445133 A | 3/2015 |
| CN | 104538640 A | 4/2015 |
| CN | 104810550 A | 7/2015 |

(Continued)

OTHER PUBLICATIONS

Machine Translation of: CN 105470473 A, Liu et al., Apr. 6, 2016.*
The Korean 1st Office Action regarding Application No. 10-2019-7000636, dated Jun. 29, 2020. English Translation Provided by http://globaldossier.uspto.gov.
The 1st Office Action regarding Chinese Patent Application No. CN201610427469.2, dated May 5, 2019. English Translation Provided by http://globaldossier.uspto.gov.
The Japanese 1st Office Action regarding Application No. 2018-566298, dated Nov. 12, 2019. English Translation Provided by http://globaldossier.uspto.gov.

(Continued)

Primary Examiner — Kenneth J Douyette
(74) Attorney, Agent, or Firm — Yue (Robert) Xu; Apex Attorneys at Law, LLP

(57) ABSTRACT

Provided in the present invention are a battery paste, a battery electrode plate, and a preparation method therefor, the battery electrode plate comprising a current collector and an electrode paste film attached to the current collector; the electrode paste film comprises an active substance, a conductive agent, a polymer binder, and fluorophosphate Compared to the prior art, by means of adjusting the components of the electrode paste film, prepared battery electrode plates of the present invention, particularly thick electrode plates, have excellent recycling performance and high rate charge and discharge performance; the preparation method is simple, easy to execute, and low cost, can incorporate existing production devices, and is suitable for use in industrial production; in addition, the battery electrode plate of the present invention contains fluorophosphate, which has a fire retardant effect and can improve the safety of lithium ion batteries $$M^{Z+}[PO_xF_y]_Z \qquad (I)$$

11 Claims, No Drawings

(56) References Cited

FOREIGN PATENT DOCUMENTS

| | | | |
|---|---|---|---|
| CN | 105074994 A | 11/2015 | |
| CN | 105322177 A | 2/2016 | |
| CN | 105470473 A | 4/2016 | |
| CN | 105580193 A | 5/2016 | |
| EP | 2120279 A1 | 11/2009 | |
| JP | 2008270199 A | 11/2008 | |
| JP | 2015122264 A | 7/2015 | |
| JP | 2015176744 A | 10/2015 | |
| WO | 2014155989 A1 | 10/2014 | |

OTHER PUBLICATIONS

The European search report for Application No. EP16905234.7, dated Dec. 13, 2019.
International Search Report for PCT/CN2016/096922 dated Mar. 2, 2017, ISA/CN.
SIPO First Office Action corresponding to Application No. 201610427469.2; dated Mar. 5, 2018.
Xu Hou, "Solid State NMR Spectroscopic Study of $Na_2MPO_4F$ (M=Fe,Mn) as Cathode Materials for Li—Na Ion Batteries", master's thesis submitted in May 2014, Xiamen University.

\* cited by examiner

//BATTERY PASTE, BATTERY ELECTRODE PLATE, AND PREPARATION METHOD THEREFOR

CROSS REFERENCE TO RELATED APPLICATIONS

This application is a US National Phase application based upon PCT Application No. PCT/CN2016/096922, filed Aug. 26. 2016, which claims the priority of Chinese Patent Application No. 201610427469.2, filed on Jun. 15, 2016, and titled with "BATTERY PASTE, BATTERY ELECTRODE PLATE, AND PREPARATION METHOD THEREFORE", and the disclosures of which are hereby incorporated by reference.

FIELD

The present disclosure relates to the field of battery technology, specifically to a battery paste, a battery electrode plate and a method for preparing the same.

BACKGROUND

Lithium ion secondary battery has become one of the most widely used secondary batteries due to its advantages of high voltage, high energy density and long cycle life. However, with the miniaturization of portable electronic devices, continuous development of long standby, and the use of high-power, high-energy devices such as electric bicycles and electric vehicles, there is an increasing demand for the energy density of lithium ion secondary batteries as energy storage sources.

In actual designs, increasing the mass percentage of the active substances or increasing the thickness of the electrode plate, as well as reducing the mass percentage of the inactive substances, are all effective methods for increasing the energy density of battery. However, the design of a thick electrode plate increases the contact distance between the active substance and the electrolyte, and prolongs the migration path of lithium ions. As a result, during the charging and discharging process of battery, lithium ions cannot reach the bottom of the electrode plate smoothly and quickly, forming a large concentration polarization, which further causes a series of problems such as insufficient battery capacity, poor rate performance, lithium deposition at low temperature, and decrease of cycle capacity.

Especially in the case of large current discharging, the concentration of lithium ions in the electrolyte gradually decreases from the location away from the current collector to the vicinity of the current collector, resulting in the generation of concentration polarization, particularly noticeable for thick electrode plates. Relative large concentration polarization leads to a non-uniform distribution of the electrochemical reaction rate, so that the active substances inside the electrode plate (close to the current collector) can hardly participate in the electrochemical reaction, resulting in an improper capacity. While the active substances in the exterior of electrode plate (away from the current collector) are deeply discharged, thereby causing structural damage during long circulation and aggravating capacity degradation.

In order to improve the above problems brought by increasing thickness of electrode plate, the key point is to increase the migration speed of lithium ions in the electrode plate. There are two ways in the conventional art:

(1) Adjust the Porosity Distribution in the Thickness Direction

In the Chinese Patent Application No. CN200580027135.6, an electrode plate structure and a method for preparing the same are disclosed. By using a multi-layer coating method, the electrode plate has a non-uniform porosity that decreases along the direction from near the current collector to away from the current collector. This type of pore distribution makes the wettability of the electrode in the electrode plate worse, thus reducing the migration speed of lithium ions in the electrode plate, especially for thick electrode plates. However, for ultra-thick electrode plates, it is difficult to achieve a smooth porosity gradient by deposition or rolling, and the multilayer composition is difficult to control in the process, which greatly increases the manufacture cost. In Chinese Patent Application No. CN201210191956.5, an electrode plate structure and a method for preparing the same are disclosed. By using a spray drying coating method, the membrane of the electrode plate has a porosity gradually increasing along the direction from surface close to the current collector to away from the surface of current collector. This type of pore distribution makes the wettability of the electrode in the electrode plate worse, thus reducing the migration speed of lithium ions in the electrode plate, thereby increasing the migration speed of lithium ions in the electrode plate. The battery assembled by the thick electrode plate prepared by the method not only has a high energy density, but also has good electrochemical performance: the capacity is normal, the rate performance is obviously improved, and the lithium deposition condition is obviously improved, and the cycle stability is also obviously improved. However, in this method, the formulation and ratio of the binder and the dispersing solvent need to be strictly controlled, and the requirements for the spray drying equipment are high (the exhaust gas temperature is often 120° C. or more, and the loss of heat energy is large). It is necessary to upgrade the conventional relevant equipment required for the coating.

(2) Add Electrical Conductive Polymers

In the Chinese Patent Application No. CN101651233 A, published on Feb. 17, 2010, a lithium ion secondary battery and a method for preparing the same are disclosed. Conductive polymer having a linear structure (polyaniline, polypyrrole, polythiophene, etc.) is used as a binder for the positive electrode active substance of a lithium ion secondary battery to improve electron conductivity in a positive electrode plate, which significantly improves the high rate discharge performance and cycle performance of the lithium ion secondary battery. However, due to such a conductive polymer contains only a rigid macromolecule backbone chain, and its adhesion ability to the negative electrode active substances is weak, when it is directly used in a negative electrode plate containing an alloy-type negative electrode active substance, the amount of use needs to be largely increased to ensure sufficient bonding ability to inhibit the volume change of the alloy-type negative electrode active substance during charge and discharge processes. In this way, on one hand the relative content of the negative electrode active substance in the negative electrode pole piece is reduced, thereby causing a decrease of the overall energy density of the lithium ion secondary battery; on the other hand, since such a conductive polymer does not have conductivity for lithium ion, excessive use will inhibit the conduction of lithium ions in the electrode plate and causes severe polarization. In Chinese Patent Publication No. CN101867037 B, published on Mar. 30, 2011, a composite electrode material for a high-power lithium ion secondary battery and a method for preparing the same are disclosed. Therein, a mixture of an organic conductive polymer and a non-conductive polymerization are used as the binder of the lithium ion secondary battery, which not only maintains the adhesion of the conventional lithium ion secondary battery, but also improves the conductivity of the electrode plate of the lithium ion secondary battery. However, since these polymers themselves do not have conductivity for lithium ion, the improvement in performance of lithium ion secondary batteries is very limited.

SUMMARY

In view of this, the technic problem to be solved by the present disclosure is to provide a battery paste, a battery electrode plate and method for preparing the same. The battery electrode plate produced by the method has a good electrochemical performance and relatively high energy density.

The present disclosure provides an electrode paste, comprising a fluorophosphate.

Preferably, the fluorophosphate is shown in formula (I):

$$M^{Z+}[PO_xF_y]_z \qquad (I)$$

wherein M is one selected from the elements in group IA, group IIA and group VIII of the periodic table, or $M^{Z+}$ is a quaternary onium cation; and x, y and z are all integers, x≥1, y≥1, z≤3, x+y=4.

Preferably, the electrode paste comprises:

| | |
|---|---|
| active substance | 75~97 parts by weight; |
| conductive agent | 1~10 parts by weight; |
| polymer binder | 1~10 parts by weight; |
| fluorophosphate | 0.1~10 parts by weight; |
| dispersing solvent | 100~200 parts by weight; | the fluorophosphate is shown in formula (I):

$$M^{Z+}[PO_xF_y]_z \qquad (I)$$

wherein M is one selected from the elements in group IA, group IIA and group VIII of the periodic table, or $M^{Z+}$ is a quaternary onium cation; and x, y and z are all integers, x≥1, y≥1

$$z≤3, x+y=4.$$

Preferably, the dispersing solvent is selected from the group consisting of N-methyl pyrrolidone, acetone, ethanol and water, or a mixture thereof.

The present disclosure further provides a battery electrode plate, comprising a current collector and an electrode paste membrane attaching on the current collector; and the electrode paste membrane is formed by the electrode paste.

Preferably, the battery electrode plate comprises the current collector and the electrode paste membrane attaching on the current collector; and the electrode paste membrane comprises active substance, conductive agent, polymer binder and fluorophosphate; the mass ratio of the active substance, conductive agent, polymer binder and fluorophosphate is (75~97):(1~10):(1~10):(0.1~10);

the fluorophosphate is shown in formula (I):

$$M^{Z+}[PO_xF_y]_z \qquad (I);$$

wherein M is one selected from the elements in group IA, group IIA and group VIII of the periodic table, or $M^{Z+}$ is a quaternary onium cation; and x, y and z are all integers, x≥1, y≥1, z≤3, x+y=4.

Preferably, the quaternary onium cation is selected from the group consisting of quaternary ammonium cations, quaternary phosphonium cations, imidazole cations, pyridine cations, piperidine cations, aniline cations and morpholine cations.

Preferably, the fluorophosphate is selected from the group consisting of tetraethylammonium difluorophosphate, 1-ethyl-3-methylimidazolium difluorophosphate, 1-butyl-3-methylimidazolium difluorophosphate, N-methypyridine difluorophosphate, N-butylpyridine difluorophosphate, N-propyl-N-methylpiperidine difluorophosphate, N-butyl-N-methylpiperidine difluorophosphate, N,N,N-triethylaniline difluorophosphate, N,N,N-trimethylaniline difluorophosphate, N,N-dimethylmorpholine difluorophosphate, N-propyl-N-methyltnorpholine difluorophosphate, and N-propyl-N-methylmorpholine difluorophosphate.

Preferably, M is lithium, sodium, potassium, calcium, iron, cobalt or nickel.

Preferably, the active substance is lithium-containing transition metal oxides, transition metal oxides, transition metal sulfides, metal lithium, lithium alloy, lithium titanate materials, carbon materials, stannic oxides, niobium oxide, vanadium oxide, titanium oxide or silicon.

Preferably, the active substance is lithium-containing transition metal oxides, transition metal oxides, transition metal sulfides, lithium transition metal phosphate, metal lithium, lithium alloy, lithium titanate materials, carbon materials, stannic oxides, niobium oxide, vanadium oxide, titanium oxide or silicon.

Preferably, the lithium-containing transition metal oxide is one or more selected from the following formulas 1~6:

$LiCoO_2$, Formula 1; $LiMn_xO_{2x}$, x=1 or 2, Formula 2; $LiNi_{1-x}Mn_xO_2$, 0≤x<1, Formula 3; $LiNi_xCo_{1-x}O_2$, 0<x<1, Formula 4; $LiNi_xMn_yCo_zO_2$, 0≤x,y,z≤1, x+y+z=1, Formula 5; $xLi_2MnO_3-(1-x)LiMO_2$, 0≤x≤1, M is Ni, Co or Mn, Formula 6; and the lithium transition metal phosphate is selected from a structure shown as the following Formula 7 and/or Formula 8:

$LiMPO_4$, M is Fe, Co, Mn or Ni, Formula 7; $LiFe_xMn_{(1-x)}PO_4$, 0≤x≤1 Formula 8.

Preferably, the polymer binder is selected from the group consisting of difluoroethylene-hexafluoropropylene copolymer, polyvinylidene difluoride, polyacrylonitrile, polymethyl methacrylate, polytetrafluoroethylene and styrene-butadiene rubber-based polymers, or a mixture thereof.

Preferably, the battery electrode plate has a thickness of 20~500 μm.

Preferably, the battery electrode plate has a. thickness of 100~500 μm.

The present disclosure further provides a method for preparing the battery electrode plate, comprising, applying the battery paste to the current collector, drying and rolling to obtain the battery electrode plate.

Preferably, the method comprises:

mixing 75~97 parts by weight of active substance, 1~10 parts by weight of conductive agent, 1~10 parts by weight of polymer binder, 0.1~10 parts by weight of fluorophosphate with 100~200 parts by weight of dispersing solvent together to obtain the electrode paste;

applying the electrode paste to the current collector, drying and rolling to obtain the battery electrode plate;

the fluorophosphate is shown as formula (I), $$M^{Z+}[PO_xF_y]_z \qquad (I);$$

wherein M is one selected from the elements in group IA, group IIA and group VIII of the periodic table, or $M^{Z+}$ is a quaternary onium cation; and x, y and z are all integers, $x \geq 1$, $y \geq 1$, $z \leq 3$, $x+y=4$.

The present disclosure further provides a lithium ion battery, comprising the battery electrode plate.

The present disclosure provides an electrode paste, a battery electrode plate and a method for preparing the same. The battery electrode plate comprises a current collector and an electrode paste membrane attaching on the current collector; the electrode paste membrane comprises active substance, conductive agent, polymer binder and fluorophospahte; the mass ratio of the active substance, conductive agent, polymer binder and fluorophosphate is (75~97):(1~10):(1~10):(0.1~10); the fluorophosphate is shown in formula (I); wherein M is one selected from the elements in group IA, group and group VIII of the periodic table, or $M^{Z+}$ is a quaternary onium cation; and x, y and z are all integers, $x \geq 1$, $y \geq 1$, $z \leq 3$, $x+y=4$. Comparing with the conventional techniques, by way of adjusting the components of the electrode paste membrane, the obtained battery electrode plates of the present disclosure, particularly thick electrode plates, have excellent recycling performance and high rate charge and discharge performance. The method is simple, easy to execute, and has a low cost, and can incorporate with existing production devices, suitable for use in industrial production. In addition, the battery electrode plate of the present disclosure contains fluorophosphate, which has a fire retardant effect and can improve the safety of lithium ion batteries.

DETAILED DESCRIPTION

The technical solutions in the embodiments of the present disclosure will be clearly and completely described in the following with reference to the embodiments of the present disclosure. It is obvious that the described embodiments are only a part of the embodiments of the present disclosure, and not all of the embodiments. All other embodiments obtained by one of ordinary skill in the art based on the embodiments of the present disclosure without creative efforts are within the protection scope of the present disclosure.

The present disclosure provides an electrode paste, comprising a fluorophosphate.

Preferably, the fluorophosphate is shown in formula (I):

$$M^{Z+}[PO_xF_y]_Z \quad (I);$$

wherein M is one selected from the elements in group IA, group IIA and group VIII of the periodic table, or MZ+ is an onium cation; and x, y and z are all integers, $x \geq 1$, $y \geq 1$, $z \leq 3$, $x+y=4$.

According to the present disclosure, more preferably, the electrode paste comprises:

| active substance | 75~97 parts by weight; |
|---|---|
| conductive agent | 1~10 parts by weight; |
| polymer binder | 1~10 parts by weight; |
| fluorophosphate | 0.1~10 parts by weight; |
| dispersing solvent | 100~200 parts by weight; | the fluorophosphate is shown in formula (I):

$$M_{z+}[PO_xF_y]_Z \quad (I);$$

wherein M is one selected from the elements in group IA, group IIA and group VIII of the periodic table, or $M^{Z+}$ is a quaternary onium cation; and x, y and z are all integers, $x \geq 1$, $y \geq 1$, $z \leq 3$, $x+y=4$.

In the present disclosure, there is no specific restriction on the source of the materials, and the materials were purchased on the market.

The content of the active substance is preferably 80~97 parts by weight, more preferably 80~95 parts by weight, and even more preferably 85~95 parts by weight. In some embodiments provided by the present disclosure, the content of the active substance is preferably 85 parts by weight; in other embodiments provided by the present disclosure, the content of the active substance is preferably 95 prats by mass. The active substance can be positive electrode material or negative electrode material well-known to one of ordinary skill in the art, and there is no specific restriction on it. In the present disclosure, the positive electrode active substance is preferably lithium-containing transition metal oxides, transition metal oxides, transition metal sulfides or lithium transition metal phosphates, more preferably lithium-containing transition metal oxides; the lithium-containing transition metal oxides can be any lithium-containing transition metal oxides conventionally used in the art, such as $LiCoO_2$, $LiMn_xO_{2x}$ (x=1, 2). $LiNi_{1-x}Mn_xO_2$ ($0 \leq x < 1$), $LiNi_xCo_{1-x}O_2$ ($0 < x < 1$), $LiNi_xMn_yCo_zO_2$ ($0 \leq x,y, z \leq 1$, $x+y+z=1$), $xLi_2MnO_3-(1-x)LiMO_2$ ($0 \leq x \leq 1$, M is Ni, Co, or Mn), etc., and more preferably $xLi2MnO_3-(1-x)LiMO_2$ ($0 \leq x \leq 1$, M is Ni, Co, or Mn). The transition metal oxides and the transition metal sulfides can be the transition metal oxides and transition metal sulfides that are suitable for using as the active positive electrode active substance and well-known to one of ordinary skill in the art, and there is no special restriction on it. In the present disclosure, $MoS_2$, $SnS_2$, $MoO_3$ or $V_2O_5$ are preferred. The lithium transition metal phosphates can be any lithium transition metal phosphates that are suitable as positive electrode active substance and well-known to one of ordinary skill in the art, and there is no special restriction on it. In the present disclosure, $LiMPO_4$ (M is Fe, Co, Mn, or Ni), $LiFe_xMn_{(1-x)}PO_4$ ($0 \leq x \leq 1$). The negative electrode active substances can be negative electrode active substances well-known to one of ordinary skill in the art, and there is no special restriction on it. In the present disclosure, the negative electrode active substance is preferably metal lithium, lithium alloy, lithium titanate materials that can be doped and de-doped lithium ions, carbon materials that can be doped and de-doped lithium ions, stannic oxides that can be doped and de-doped lithium ions, niobium oxides that can be doped and de-doped lithium ions, vanadium oxides that can be doped and de-doped lithium ions, titanium oxides that can be doped and de-doped lithium ions or silicon that can be doped and de-doped lithium ions. The carbon materials that can be doped and de-doped lithium ions is preferably graphite or amorphous carbon, and more preferably activated carbon, carbon fiber, carbon black or natural graphite.

In the battery paste provided by the present disclosure, the content of the conductive agent is preferably 1~8 parts by weight, and more preferably 2~7, even more preferably 3~6 parts by weight, and most preferably 4~6 parts by weight. In some embodiments provided by the disclosure, the content of the conductive agent is preferably 5 parts by weight. The conductive agent can be conductive agents well-known to one of ordinary skill in the art, and there is no special restriction on it. In the present disclosure, the conductive agent is preferably carbon materials, more preferably carbon black and/or acetylene black. When the electrode paste is used as the negative electrode paste, the negative electrode active substance may be carbon material, which can function as the conductive agent at the same time.

The content of the polymer binder is preferably 1~9 parts by weight, and more preferably 1~8, and even more preferably 1~7 parts by weight. In some embodiments provided by the disclosure, the content of the polymer binder is preferably 7 parts by weight. In other embodiments provided by the present disclosure, the content of the polymer binder is preferably 1 part by weight. The polymer binder can be polymer binders well-known to one of ordinary skill in the art, and there is no special restriction on it. The polymer binder may be oil-soluble polymer binder or water-soluble polymer binder. In the present disclosure, the polymer binder is preferably selected from the group consisting of vinylidene difluoride/hexafluoropropylene copolymer, polyvinylidene difluoride, polyacrylonitrile, polymethyl methacrylate, polytetrafluoroethylene and styrene-butadiene rubber-based polymers, or a mixture thereof.

The content of the fluorophosphate is preferably 1~8 parts by weight, more preferably 1~6 parts by weight, even more preferably 1~5 parts by weight, and most preferably 1~3 parts by weight. in some embodiments provided by the present disclosure, the content of the fluorophosphate is preferably 3 parts by weight. The fluorophosphate is shown as formula (I):

$$M^{Z+}[PO_xF_y]_z \quad (I);$$

wherein M is one selected from the elements in group IA, group IIA and group VIII of the periodic table, or $M^{Z+}$ is a quaternary onium cation; and x, y and z are all integers, x≥1, y≥1, z≤3, x+y=4.

M is preferably lithium, sodium, potassium, calcium, iron, cobalt or nickel. The quaternary onium cation is preferably one selected from quaternary ammonium cations, quaternary phosphonium cations, imidazole cations, pyridine cations, piped dine cations, aniline cations and morpholine cations. In some embodiments provided by the present disclosure, the fluorophosphate is preferably sodium difluorophosphate. In some embodiments provided by the present disclosure, the fluorophosphate is preferably potassium difluorophosphate. In some embodiments provided by the present disclosure, the quaternary onium cation type fluorophosphate is preferably tetraethylammonium difluorophosphate, 1-ethyl-3-methylimidazolium difluorophosphate, 1-butyl-3-methylimidazolium difluorophosphate, N-methylpyridine difluorophosphate, N-butylpyridine difluorophosphate, N-propyl-N-methylpiperidine difluorophosphate, N-butyl-N-methylpiperidine difluorophosphate, N,N,N-triethylaniline difluorophosphate, N,N,N-trimethylaniline difluorophosphate, N,N-dimethylmorpholine difluorophosphate, N-propyl-N-methylmorpholine difluorophosphate and N-propyl-N-methylmorpholine difluorophosphate, etc. According to the practicality of production, the quaternary onium cation type fluorophosphate is preferably tetraethylammonium difluorophosphate.

The content of the dispersing solvent is preferably 100~200 parts by weight. The dispersing solvent can be dispersing solvents well-known to one of ordinary skill in the art, which may be an oil-soluble solvent or a water-soluble solvent, and there is no special restriction on it. In the present disclosure, the dispersing solvent is selected from the group consisting of N-methyl pyrrolidon, acetone, ethanol and water, or a mixture thereof, and more preferably N-methyl pyrrolidone, acetone, ethanol or water.

When the electrode paste is as negative electrode paste, the electrode paste preferably further comprises 0.5~10 parts by weight of thickening agent, more preferably 0.5~8 parts by weight of thickening agent, even more preferably 1~5 parts by weight of thickening agent, and most preferably 1~3 parts by weight of thickening agent, The thickening agent can be thickening agents well-known to one of ordinary skill in the art, and there is no special restriction on it. In the present disclosure, the thickening agent is preferably sodium carboxymethylcellulose.

In the present disclosure, a battery electrode plate is also provided, which comprises a current collector and an electrode paste membrane attaching to the current collector; and the electrode paste membrane is formed by the above-mentioned electrode paste.

In the present disclosure, preferably, the electrode paste membrane comprises active substance, conductive agent, polymer binder and fluorophosphate; and the mass ratio of the active substance, conductive agent, polymer hinder and fluorophosphate is (75~97):(1~10):(1~10):(0.1~10).

Therein, the current collector can be the current collectors well-known to one of ordinary skill in the art, and there is no special restriction. In the present disclosure, the current collector is preferably an aluminum current collector or copper current collector.

The electrode paste membrane is formed by the above electrode paste. The active substance, conductive agent, polymer binder and fluorophosphate are the same as that above, which are not stated again herein. The mass ratio of the active substance, conductive agent, polymer binder and fluorophosphate is preferably (80~97):(1~8):(2~10):(1~8), more preferably (80~95):(2~7):(2~8):(1~6), even more preferably (85~95):(3~6):(2~7):(1~5), and most preferably (85~95):(4~6):(2~7):(1~3).

The thickness of the battery electrode plate is preferably 20~500 μm, more preferably 200~500 μm, more preferably 300~500 μm, even more preferably 300~450 μm, and most preferably 350~400 μm. In some embodiments provided by the present disclosure, the thickness of the battery electrode plate is preferably 375 μm; and in other embodiments provided by the present disclosure, the thickness of the battery electrode plate is preferably 360 μm.

In the present disclosure, the fluorophosphate of the battery electrode plate may be detected by the following three fast-detecting methods.

(1) X-Radial Diffraction (XRD): collecting the solid sample close to the surface of the current collector, and testing the collected sample with X-radial diffraction instrument; test parameters: scanning range of 10°-80°, scanning step of 0.02° per second.

(2) Scanning Electronic Microscopy-Energy Dispersive X-ray (SEM-EDX): collecting the solid sample close to the surface of the current collector, and testing the collected sample with SEM-EDX of the scanning electronic microscopy.

(3) Nuclear Magnetic Resonance (NMR): collecting the solid sample ($m_1$) close to the surface of the current collector, washing and filtering the solid sample with a certain amount of acetone (or other solvents), combining the acetone phases, subjecting the resultant to concentrating and vacuum drying, weighing the obtained sample ($m_2$), and testing the samples with NNR to obtain the fluorine spectrum ($_{19}$F-NMR) and phosphorus spectrum ($^{31}$P-NMR). The above detection methods (1) and (2) can be used as auxiliary methods. When the cation of fluorophosphate is a quaternary onium cation, the hydrogen spectrum ($^1$H-NMR) and the carbon spectrum ($^{12}$C-NMR) are also detected. The formula for calculating the concentration of fluorophosphate in the electrode plate is: $C=m_2/m_1\times100\%$.

In the present disclosure, through adjusting the composition of the electrode paste membrane, the obtained battery electrode plate, especially thick electrode plate, has a good cycling performance and high rate charge and discharge performance. The method for preparing is simple and easy, the cost is low, the existing production equipment can be incorporated, and it is suitable for industrial production. At the same time, the battery electrode plate of the present invention contains fluorophosphate, which has a fire retardant effect and can improve the safety of lithium ion batteries.

The present disclosure also provides a method for preparing the battery electrode plate, comprising applying the battery paste to the current collector, drying and rolling to obtain the battery electrode plate.

In the present disclosure, the method preferably comprises the following steps: mixing 75~97 parts by weight of active substance, 1~10 parts by weight of conductive agent, 1~10 parts by weight of polymer binder, 0.1~10 parts by weight of fluorophosphate with 100~200 parts by weight of dispersing solvent together to obtain the electrode paste; applying the electrode paste to the current collector, drying and rolling to obtain the battery electrode plate;

the fluorophosphate is shown as formula (I)

$$M^{Z+}[PO_xF_y]_Z \quad (I);$$

wherein M is one selected from the elements in group IA, group IIA and group VIII of the periodic table, or $M^{Z+}$ is a quaternary onium cation; and x, y and z are all integers, x≥1, y≥1 z≤3, x+y=4.

The active substance, conductive agent, polymer binder, fluorophosphate and dispersing solvent are the same as those above, which are not repeated herein.

The method for preparing the battery electrode plate provided by the present disclosure is simple and easy, the cost is low, the existing production equipment can be incorporated, and it is suitable for industrial production.

The present disclosure also provides a lithium ion battery, comprising the above battery electrode plate, which preferably further comprises a non-aqueous electrolyte and a separator.

The separator can be any material conventionally used in lithium ion battery. The separator should have low resistance to migration of ions in the electrolyte and good absorptive capacity and wettability to the electrolyte. For example, the material may be a nonwoven or woven fabric of glass fiber, polyester, polyethylene, polytetrafluoroethylene, and a combination thereof. A windable porous separator such as polyethylene or polypropylene is more preferred.

The lithium ion battery provided by the present disclosure may be cylindrical, coin-shaped, square, or any other shapes.

For further description of the present disclosure, a battery paste, a battery electrode plate and a method for preparing the same provided by the present disclosure will be illustrated in detail in conjunction with examples hereinafter.

The reagents used in the following examples are all purchased on market.

Example 1

Preparation of Positive Electrode A1

1.1 85 parts by weight of lithium cobalt oxide ($LiCoO_2$, as the positive electrode active substance), 5 parts by weight of acetylene black (as the electrical conductive material), 7 parts by weight of polyvinylidene fluoride (PVD, as the polymer binder) and 3 parts by weight of sodium difluorophosphate were mixed in N-methyl pyrrolidone solvent to prepare an electrode paste.

1.2 The electrode paste obtained in 1.1 was coated on both sides of an aluminum foil with a thickness of 15 μm, and dried. The aluminum foil was subjected to stretching and pressing with a pressing machine until the thickness reached 375 μm. The aluminum foil was then cut into a shape which has a 100 mm width and 100 mm length active substance layer, and 30 mm width non-coated part. The obtained product was regarded as positive electrode A1.

Example 2

Preparation of Positive Electrode A2

Instead of lithium cobalt oxide, nickel manganese lithium cobalt oxide ($LiNi_{1/3}Mn_{1/3}Co_{1/3}O_2$) was used as the positive active substance. The preparation method was the same as that of the positive electrode A1. The obtained product was regarded as the positive electrode A2.

Example 3

Preparation of Positive Electrode A3

Instead of lithium cobalt oxide, lithium iron phosphate ($LiFePO_4$) was used as the positive active substance. The preparation method was the same as that of the positive electrode A1. The obtained product was regarded as the positive electrode A3.

Example 4

Preparation of Positive Electrode A4

Instead of lithium cobalt oxide, lithium-rich nickel manganese cobalt oxide ($Li_{1.2}Ni_{1/6}Mn_{1/6}Co_{4/6}O_2$) was used as the positive active substance. The preparation method was the same as that of the positive electrode A1. The obtained product was regarded as the positive electrode A4.

Example 5

Preparation of Positive Electrode A5

Instead of sodium difluorophosphate, lithium difluorophosphate was used. The preparation method was the same as that of the positive electrode A1. The obtained product was regarded as the positive electrode A5.

Example 6

Preparation of Positive Electrode A6

Instead of sodium difluorophosphate, lithium difluorophosphate was used. The preparation method was the same as that of the positive electrode A2. The Obtained product was regarded as the positive electrode A6.

Example 7

Preparation of Positive Electrode A7

Instead of sodium difluorophosphate, lithium difluorophosphate was used. The preparation method was the same as that of the positive electrode A3. The obtained product was regarded as the positive electrode A7.

Example 8

Preparation of Positive Electrode A8

Instead of sodium difluorophosphate, lithium difluorophosphate was used. The preparation method was the same as that of the positive electrode A4. The obtained product was regarded as the positive electrode A8.

Example 9

Preparation of Positive Electrode A9

Instead of sodium difluorophosphate, tetraethylammonium difluorophosphate was used. The preparation method was the same as that of the positive electrode A1. The obtained product was regarded as the positive electrode A9.

Example 10

Preparation of Positive Electrode A10

Instead of sodium difluorophosphate, tetraethylammonium difluorophosphate was used. The preparation method was the same as that of the positive electrode A2. The obtained product was regarded as the positive electrode A10.

Example 11

Preparation of Positive Electrode A11

Instead of sodium difluorophosphate, tetraethylammonium difluorophosphate was used.

The preparation method was the same as that of the positive electrode A3. The obtained product was regarded as the positive electrode A11.

Example 12

Preparation of Positive Electrode A12

Instead of sodium difluorophosphate, tetraethylammonium difluorophosphate was used. The preparation method was the same as that of the positive electrode A4. The obtained product was regarded as the positive electrode A12.

Example 13

Preparation of Negative Electrode C1

100 parts by weight of sodium carboxymethylcellulose-added water-soluble dispersing solvent (sodium carboxymethylcellulose as the thickening agent, concentration 1%), 2 parts by weight of styrene-butadiene rubber water-soluble dispersing solvent (as the binder, concentration 50%) and 3 parts by weight of sodium difluorophosphate were added to 95 parts by weight of artificial graphite KS-44 powders, and the resultant was mixed by a disperser to prepare a paste. The obtained paste was coated on both sides of a copper foil with a thickness of 10 μm, and dried. The copper foil was subjected to stretching and pressing with a pressing machine until the thickness reached 360 μm. The copper foil was then cut into a shape which has a 104 mm width and 104 mm length active substance layer, and 30 mm width non-coated part. The obtained product was regarded as negative electrode C1.

Example 14

Preparation of Negative Electrode C2

Instead of artificial graphite, natural graphite was used. The preparation method was the same as that of the negative electrode C1. The obtain product was regarded as the negative electrode C2.

Example 15

Preparation of Negative Electrode C3

Instead of sodium difluorophosphate, lithium difluorophosphate was used. The preparation method was the same as that of the negative electrode C1. The obtain product was regarded as the negative electrode C3.

Example 16

Preparation of Negative Electrode C4

Instead of sodium difluorophosphate, tetraethylammonium difluorophosphate was used. The preparation method was the same as that of the negative electrode C1. The obtain product was regarded as the negative electrode C4.

Example 17

Preparation of Negative Electrode C5

Instead of sodium difluorophosphate, lithium difluorophosphate was used. The preparation method was the same as that of the negative electrode C2. The obtain product was regarded as the negative electrode C5.

Example 18

Preparation of Negative Electrode C6

Instead of sodium difluorophosphate, tetraethylammonium difluorophosphate was used. The preparation method was the same as that of the negative electrode C2. The obtain product was regarded as the negative electrode C6.

Comparative Example 1

Preparation of Positive Electrode B1

1.1 85 parts by weight of lithium cobalt oxide ($LiCoO_2$, as the positive electrode active substance), 8 parts by weight of acetylene black (as the electrical conductive material) and 7 parts by weight of polyvinylidene fluoride (PVDF, as the binder) were mixed in N-methyl pyrrolidone solvent to prepare the electrode paste.

1.2 The electrode paste obtained in 1.1 were coated on both sides of an aluminum foil with a thickness of 15 μm, and dried. The aluminum foil was subjected to stretching and pressing with a pressing machine until the thickness reached 360 μm. The aluminum foil was then cut into a shape which has a 100 mm width and 100 mm length active substance layer, and 30 mm width non-coated part. The obtained product was regarded as positive electrode B1.

Comparative Example 2

Preparation of Positive Electrode B2

Instead of lithium cobalt oxide, nickel manganese lithium cobalt oxide ($LiNi_{1/3}Mn_{1/3}Co_{1/3}O_2$) was used as the positive active substance. The preparation method was the same as that of the positive electrode B1. The obtain product was regarded as the positive electrode B2.

Comparative Example 3

Preparation of Positive Electrode B3

Instead of lithium cobalt oxide, iron lithium phosphate (LiFePO$_4$) was used as the positive active substance. The preparation method was the same as that of the positive electrode B1. The obtain product was regarded as the positive electrode B3.

Comparative Example 4

Preparation of Positive Electrode B4

Instead of lithium cobalt oxide, lithium-rich nickel manganese cobalt oxide (Li$_{1.2}$Ni$_{1/6}$Mn$_{1/6}$Co4/6O$_2$) was used as the positive active substance. The preparation method was the same as that of the positive electrode B1. The obtain product was regarded as the positive electrode B4.

Comparative Example 5

Preparation of Negative Electrode B5

5.1 200 parts by weight of sodium carboxymethylcellulose-added water-soluble dispersing solvent (sodium carboxymethylcellulose as the thickening agent, concentration 1%), 6 parts by weight of styrene-butadiene rubber water-soluble dispersing solvent (as the binder, concentration 50%) were added to 95 parts by weight of artificial graphite KS-44 powders, and the resultant was mixed by a disperser to prepare an electrode paste.

5.2 The paste obtained in 5.1 was coated on both sides of a copper foil with a thickness of 10 μm, and dried. The copper foil was subjected to stretching and pressing with a pressing machine until the thickness reached 360 μm. The copper foil was then cut into a shape which has a 104 mm width and 104 mm length active substance layer, and 30 mm width non-coated part. The obtained product was regarded as negative electrode B5.

Comparative Example 6

Preparation of Negative Electrode B6

Instead of artificial graphite, natural graphite was used. The preparation method was the same as that of the negative electrode B5. The obtain product was regarded as the negative electrode B6.

Formulations of the electrolyte were shown in Table 1.

| | Lithium salt | | Non-water soluble solvent | | Other additives | |
|---|---|---|---|---|---|---|
| | Type | concentration/mol | Type | Ratio v/v | Type | Content/% |
| Electrolyte 1 | LiPF$_6$ | 1 | EC:EMC:DMC | 1:1:1 | — | — |
| Electrolyte 2 | LiPF$_6$ | 1.2 | EC:EMC | 3:7 | — | — |
| Electrolyte 3 | LiPF$_6$ | 1 | EC:EMC:DMC | 1:1:1 | VC | 3 |

Assembling of lithium ion secondary battery: the positive electrode and the negative electrode were overlapped with a polyethylene-made separator and winded, so that the positive electrode and the negative electrode were not directly contacted, to obtain an electrode body. The terminals of the positive electrode and the negative electrode were exposed out and installed in the battery can. Then, 5 mL of the above-mentioned electrolyte was injected. After riveting and shaping, a 18650-type cylindrical battery was obtained, which was a lithium ion secondary battery.

Examples 19~90 and Comparative Examples 7~14

For the examples 19~90 and the comparative examples 7~14, each was assembled according to the experimental conditions shown in Table 2 and Table 3 (type of positive and negative electrodes, electrolyte, and charging and discharging voltage range), and the obtained products hereinafter were evaluated according to the following items. The results were also shown in Table 2 and Table 3.

Evaluation of Secondary Battery

The evaluation of secondary battery was based on the performances of each battery under the following conditions.

Circulation Maintenance Rate

Charging and discharging of primary period: after charging to 4.3 V with a constant current and constant voltage charging method of 0.2 C at 25° C., the battery was discharged to 3.0 V at a constant current of 0.2 C. The battery was subjected to 5 cycles so as to stabilize the battery. The discharge capacity at the fifth cycle was set as the initial capacity. In addition, the current value of the rated discharge capacity in 1 hour was set as 1 C.

Circulation experiment: for the battery experienced the initial charge and discharge, 500 cycles of the following charge and discharge cycle were carried out at 25° C.: after charging to 4.3 V at a constant current and constant voltage of 1 C, discharging was performed at a constant current of 1 C to 3.0 V. The ratio of the discharge capacity at the 500th cycle and the discharge capacity at the first cycle was counted as the circulation maintenance rate.

Results:

TABLE 2

Assembling and test results of batteries in the examples

| | Materials of Electrode | | | Capacity per Gram of Primary Period mAh · g$^{-1}$ | Circulation Maintenance Rate/% |
|---|---|---|---|---|---|
| | Positive Electrode | Negative Electrode | Electrolyte | | |
| Example 19 | A1 | C1 | 1 | 155 | 82 |
| Example 20 | A1 | C2 | 1 | 155 | 83 |
| Example 21 | A1 | C3 | 1 | 157 | 85 |
| Example 22 | A1 | C4 | 1 | 156 | 84 |
| Example 23 | A1 | C5 | 1 | 157 | 86 |
| Example 24 | A1 | C6 | 1 | 156 | 84 |
| Example 25 | A2 | C1 | 2 | 160 | 82 |
| Example 26 | A2 | C2 | 2 | 160 | 83 |
| Example 27 | A2 | C3 | 2 | 162 | 89 |
| Example 28 | A2 | C4 | 2 | 161 | 85 |
| Example 29 | A2 | C5 | 2 | 162 | 88 |
| Example 30 | A2 | C6 | 2 | 161 | 84 |
| Example 31 | A3 | C1 | 1 | 167 | 81 |
| Example 32 | A3 | C2 | 1 | 167 | 83 |
| Example 33 | A3 | C3 | 1 | 167 | 85 |
| Example 34 | A3 | C4 | 1 | 167 | 82 |
| Example 35 | A3 | C5 | 1 | 167 | 84 |
| Example 36 | A3 | C6 | 1 | 167 | 82 |
| Example 37 | A4 | C1 | 2 | 255 | 83 |

TABLE 2-continued

Assembling and test results of batteries in the examples

| | Materials of Electrode | | | Capacity per Gram of Primary Period mAh·g⁻¹ | Circulation Maintenance Rate/% |
|---|---|---|---|---|---|
| | Positive Electrode | Negative Electrode | Electrolyte | | |
| Example 38 | A4 | C2 | 2 | 255 | 85 |
| Example 39 | A4 | C3 | 2 | 256 | 86 |
| Example 40 | A4 | C4 | 2 | 255 | 83 |
| Example 41 | A4 | C5 | 2 | 256 | 86 |
| Example 42 | A4 | C6 | 2 | 255 | 84 |
| Example 43 | A5 | C1 | 1 | 155 | 84 |
| Example 44 | A5 | C2 | 1 | 155 | 83 |
| Example 45 | A5 | C3 | 1 | 156 | 86 |
| Example 46 | A5 | C4 | 1 | 155 | 85 |
| Example 47 | A5 | C5 | 1 | 156 | 87 |
| Example 48 | A5 | C6 | 1 | 155 | 85 |
| Example 49 | A6 | C1 | 2 | 160 | 84 |
| Example 50 | A6 | C2 | 2 | 160 | 83 |
| Example 51 | A6 | C3 | 2 | 160 | 88 |
| Example 52 | A6 | C4 | 2 | 159 | 85 |
| Example 53 | A6 | C5 | 2 | 160 | 89 |
| Example 54 | A6 | C6 | 2 | 160 | 86 |
| Example 55 | A7 | C1 | 1 | 167 | 83 |
| Example 56 | A7 | C2 | 1 | 167 | 84 |
| Example 57 | A7 | C3 | 1 | 167 | 86 |
| Example 58 | A7 | C4 | 1 | 167 | 84 |
| Example 59 | A7 | C5 | 1 | 167 | 86 |
| Example 60 | A7 | C6 | 1 | 167 | 85 |
| Example 61 | A8 | C1 | 2 | 254 | 84 |
| Example 62 | A8 | C2 | 2 | 255 | 85 |
| Example 63 | A8 | C3 | 2 | 255 | 87 |
| Example 64 | A8 | C4 | 2 | 255 | 84 |
| Example 65 | A8 | C5 | 2 | 255 | 88 |
| Example 66 | A8 | C6 | 2 | 255 | 86 |
| Example 67 | A9 | C1 | 1 | 153 | 81 |
| Example 68 | A9 | C2 | 1 | 154 | 83 |
| Example 69 | A9 | C3 | 1 | 153 | 83 |
| Example 70 | A9 | C4 | 1 | 154 | 82 |
| Example 71 | A9 | C5 | 1 | 155 | 82 |
| Example 72 | A9 | C6 | 1 | 154 | 80 |
| Example 73 | A10 | C1 | 2 | 159 | 80 |
| Example 74 | A10 | C2 | 2 | 158 | 81 |
| Example 75 | A10 | C3 | 2 | 159 | 83 |
| Example 76 | A10 | C4 | 2 | 158 | 81 |
| Example 77 | A10 | C5 | 2 | 159 | 82 |
| Example 78 | A10 | C6 | 2 | 158 | 80 |
| Example 79 | A11 | C1 | 1 | 167 | 81 |
| Example 80 | A11 | C2 | 1 | 166 | 82 |
| Example 81 | A11 | C3 | 1 | 166 | 84 |
| Example 82 | A11 | C4 | 1 | 166 | 81 |
| Example 83 | A11 | C5 | 1 | 166 | 81 |
| Example 84 | A11 | C6 | 1 | 166 | 80 |
| Example 85 | A12 | C1 | 2 | 254 | 82 |
| Example 86 | A12 | C2 | 2 | 254 | 83 |
| Example 87 | A12 | C3 | 2 | 255 | 85 |
| Example 88 | A12 | C4 | 2 | 255 | 81 |
| Example 89 | A12 | C5 | 2 | 255 | 84 |
| Example 90 | A12 | C6 | 2 | 255 | 81 |

TABLE 3

Assembling and test results of batteries in the comparative examples

| | Materials of Electrode | | | Capacity per Gram of Primary Period mAh·g⁻¹ | Circulation Maintenance Rate/% |
|---|---|---|---|---|---|
| | Positive Electrode | Negative Electrode | Electrolyte | | |
| Comparative Example 7 | B1 | B5 | 1 | 155 | 65 |
| Comparative Example 8 | B1 | B6 | 3 | 155 | 69 |
| Comparative Example 9 | B2 | B5 | 1 | 162 | 75 |
| Comparative Example 10 | B2 | B6 | 3 | 162 | 81 |
| Comparative Example 11 | B3 | B5 | 1 | 167 | 75 |
| Comparative Example 12 | B3 | B6 | 3 | 167 | 78 |
| Comparative Example 13 | B4 | B5 | 2 | 255 | 67 |
| Comparative Example 14 | B4 | B6 | 2 | 255 | 68 |

From results of Table 2 and Table 3, the following conclusions were obtained.

Comparing the examples 19~24, examples 43~48, examples 67~72 with the Comparative example 7 and Comparative example 8, the circular maintenance rate of the examples 19~24, examples 43~48 and examples 67~72 battery electrodes obtained by the preparation method of the present disclosure significantly increased comparing with Comparative example 7 and Comparative example 8.

In addition, comparing the examples 25~30, examples 49~54, examples 73~78 with the Comparative example 9 and Comparative example 10, the circular maintenance rate of the examples 25~30, examples 49~54 and examples 73~78 battery electrodes obtained by the preparation method of the present disclosure significantly increased comparing with Comparative example 9 and Comparative example 10.

Comparing the examples 31~36, examples 55~60, examples 79~84 with the Comparative example 11 and Comparative example 12, the circular maintenance rate of the examples 31~36, examples 55~60 and examples 79~84 battery electrodes obtained by the preparation method of the present disclosure significantly increased comparing with the Comparative example 11 and Comparative example 12.

Comparing the examples 37~42, examples 61~66, examples 85~90 with the Comparative example 13 and Comparative example 14, the circular maintenance rate of the examples 37~42, examples 61~66 and examples 85~90 battery electrodes obtained by the preparation method of the present disclosure significantly increased comparing with the Comparative example 13 and Comparative example 14.

It can be concluded from the results above that the lithium ion secondary battery that uses the battery electrode plate of the present disclosure has excellent large-current discharge characteristics and circulation maintenance rate.

Examples 91~140

For examples 91~140, each example was assembled according to the combination of experimental conditions (influences of different fluorophosphate contents on performances of battery) shown in Table 4, and the performances were tested for evaluation. Therein, the positive electrode binder was PVDF, the negative electrode binder was CMC and SBR, and the fluorophosphate was lithium difluorophosphate. In the examples, the type and logograms of the positive electrode active substances were shown hereinafter: lithium cobalt oxide ($LiCoO_2$), nickel manganese lithium cobalt oxide ($LiNi_{1/3}Mn_{1/3}Co_{1/3}O_2$, NCM111; $LiNi_{3/5}Mn_{1/5}Co_{1/5}O_2$, NCM622), lithium-rich nickel manganese cobalt oxide ($Li_{1.2}Ni_{1/6}Mn_{1/6}Co_{4/6}O_2$, LR-NMC114), iron lithium phosphate ($LiFePO_4$), and lithium manganese cobalt oxide ($LiMnPO_4$).

TABLE 4

Effects of fluorophosphate content on battery performance

| Example | Positive/Negative Electrode (Type) | Paste Formulation/Part by Weight | | | | | Capacity per Gram of Primary Period mAh·g$^{-1}$ | Circulation Maintenance Rate/% |
|---|---|---|---|---|---|---|---|---|
| | | Active substance | Conductive Agent | Binder | Fluorophosphate | Electrolyte | | |
| 91 | Positive ($LiCoO_2$) | 85 | 8 | 6.9 | 0.1 | 1 | 155 | 81 |
| | Negative (Artificial Graphite) | 80 | 10 | 10 | 0 | | | |
| 92 | Positive ($LiCoO_2$) | 85 | 8 | 6 | 1 | 1 | 156 | 85 |
| | Negative (Artificial Graphite) | 80 | 10 | 10 | 0 | | | |
| 93 | Positive ($LiCoO_2$) | 85 | 7 | 6 | 2 | 1 | 155 | 86 |
| | Negative (Artificial Graphite) | 80 | 10 | 10 | 0 | | | |
| 94 | Positive ($LiCoO_2$) | 85 | 5 | 5 | 5 | 1 | 152 | 84 |
| | Negative (Artificial Graphite) | 80 | 10 | 10 | 0 | | | |
| 95 | Positive ($LiCoO_2$) | 85 | 5 | 3 | 7 | 1 | 150 | 83 |
| | Negative (Artificial Graphite) | 80 | 10 | 10 | 0 | | | |
| 96 | Positive ($LiCoO_2$) | 80 | 5 | 5 | 10 | 1 | 156 | 84 |
| | Negative (Artificial Graphite) | 80 | 10 | 10 | 0 | | | |
| 97 | Positive (NMC111) | 85 | 8 | 6.9 | 0.1 | 2 | 161 | 82 |
| | Negative (Artificial Graphite) | 80 | 10 | 10 | 0 | | | |
| 98 | Positive (NMC111) | 85 | 8 | 6 | 1 | 2 | 162 | 88 |
| | Negative (Artificial Graphite) | 80 | 10 | 10 | 0 | | | |
| 99 | Positive (NMC111) | 85 | 7 | 6 | 2 | 2 | 160 | 86 |
| | Negative (Artificial Graphite) | 80 | 10 | 10 | 0 | | | |
| 100 | Positive (NMC111) | 85 | 5 | 5 | 5 | 2 | 159 | 83 |
| | Negative (Artificial Graphite) | 80 | 10 | 10 | 0 | | | |
| 101 | Positive (NMC111) | 85 | 4 | 3 | 8 | 2 | 159 | 82 |
| | Negative (Artificial Graphite) | 80 | 10 | 10 | 0 | | | |
| 102 | Positive (NMC111) | 80 | 5 | 5 | 10 | 2 | 159 | 82 |
| | Negative (Artificial Graphite) | 80 | 10 | 10 | 0 | | | |
| 103 | Positive (NMC622) | 85 | 8 | 6.9 | 0.1 | 2 | 174 | 90 |
| | Negative (Artificial Graphite) | 80 | 10 | 10 | 0 | | | |
| 104 | Positive (NMC622) | 85 | 8 | 6.5 | 0.5 | 2 | 174 | 91 |
| | Negative (Artificial Graphite) | 80 | 10 | 10 | 0 | | | |
| 105 | Positive (NMC622) | 85 | 8 | 6 | 1 | 2 | 170 | 91 |
| | Negative (Artificial Graphite) | 80 | 10 | 10 | 0 | | | |
| 106 | Positive (NMC622) | 85 | 7 | 6 | 2 | 2 | 167 | 93 |
| | Negative (Artificial Graphite) | 80 | 10 | 10 | 0 | | | |
| 107 | Positive (NMC622) | 85 | 8 | 6.5 | 0.5 | 2 | 175 | 83 |
| | Negative (Silicon-carbon Material) | 75 | 10 | 15 | 0 | | | |
| 108 | Positive (NMC622) | 85 | 8 | 6 | 1 | 2 | 173 | 85 |
| | Negative (Silicon-carbon Material) | 75 | 10 | 15 | 0 | | | |
| 109 | Positive (NMC622) | 85 | 7 | 6 | 2 | 2 | 173 | 87 |
| | Negative (Silicon-carbon Material) | 75 | 10 | 15 | 0 | | | |
| 110 | Positive (NMC622) | 80 | 5 | 5 | 10 | 2 | 175 | 85 |
| | Negative (Artificial Graphite) | 80 | 10 | 10 | 0 | | | |
| 111 | Positive (LR-NMC114) | 85 | 8 | 6.9 | 0.1 | 2 | 255 | 82 |
| | Negative (Artificial Graphite) | 80 | 10 | 10 | 0 | | | |

TABLE 4-continued

Effects of fluorophosphate content on battery performance

| Example | Positive/Negative Electrode (Type) | Active substance | Conductive Agent | Binder | Fluorophosphate | Electrolyte | Capacity per Gram of Primary Period mAh · g$^{-1}$ | Circulation Maintenance Rate/% |
|---|---|---|---|---|---|---|---|---|
| 112 | Positive (LR-NMC114) | 90 | 4.9 | 5 | 0.1 | 2 | 255 | 83 |
| | Negative (Artificial Graphite) | 80 | 10 | 10 | 0 | | | |
| 113 | Positive (LR-NMC114) | 95 | 2 | 2.9 | 0.1 | 2 | 255 | 81 |
| | Negative (Artificial Graphite) | 80 | 10 | 10 | 0 | | | |
| 114 | Positive (LR-NMC114) | 85 | 8 | 6.5 | 0.5 | 2 | 255 | 83 |
| | Negative (Artificial Graphite) | 80 | 10 | 10 | 0 | | | |
| 115 | Positive (LR-NMC114) | 85 | 8 | 6 | 1 | 2 | 254 | 85 |
| | Negative (Artificial Graphite) | 80 | 10 | 10 | 0 | | | |
| 116 | Positive (LR-NMC114) | 85 | 7 | 6 | 2 | 2 | 255 | 86 |
| | Negative (Artificial Graphite) | 80 | 10 | 10 | 0 | | | |
| 117 | Positive (LR-NMC114) | 85 | 5 | 5 | 5 | 2 | 254 | 85 |
| | Negative (Artificial Graphite) | 80 | 10 | 10 | 0 | | | |
| 118 | Positive (LR-NMC114) | 85 | 4 | 3 | 8 | 2 | 255 | 83 |
| | Negative (Artificial Graphite) | 80 | 10 | 10 | 0 | | | |
| 119 | Positive (LR-NMC114) | 85 | 8 | 6.5 | 0.5 | 2 | 255 | 80 |
| | Negative (Silicon-carbon Material) | 75 | 10 | 15 | 0 | | | |
| 120 | Positive (LR-NMC114) | 85 | 8 | 6 | 1 | 2 | 255 | 82 |
| | Negative (Silicon-carbon Material) | 75 | 10 | 15 | 0 | | | |
| 121 | Positive (LR-NMC114) | 85 | 7 | 6 | 2 | 2 | 255 | 84 |
| | Negative (Silicon-carbon Material) | 75 | 10 | 15 | 0 | | | |
| 122 | Positive (LR-NMC114) | 85 | 5 | 5 | 5 | 2 | 255 | 81 |
| | Negative (Silicon-carbon Material) | 75 | 10 | 15 | 0 | | | |
| 123 | Positive (LR-NMC114) | 85 | 4 | 3 | 8 | 2 | 255 | 79 |
| | Negative (Silicon-carbon Material) | 75 | 10 | 15 | 0 | | | |
| 124 | Positive (LR-NMC114) | 80 | 5 | 5 | 10 | 2 | 255 | 83 |
| | Negative (Artificial Graphite) | 80 | 10 | 10 | 0 | | | |
| 125 | Positive (LR-NMC114) | 80 | 5 | 5 | 10 | 2 | 255 | 79 |
| | Negative (Silicon-carbon Material) | 75 | 10 | 15 | 0 | | | |
| 126 | Positive (LiFePO$_4$) | 85 | 8 | 6.9 | 0.1 | 1 | 166 | 81 |
| | Negative (Artificial Graphite) | 80 | 10 | 10 | 0 | | | |
| 127 | Positive (LiFePO$_4$) | 85 | 8 | 6.5 | 0.5 | 1 | 166 | 82 |
| | Negative (Artificial Graphite) | 80 | 10 | 10 | 0 | | | |
| 128 | Positive (LiFePO$_4$) | 85 | 8 | 6 | 1 | 1 | 166 | 85 |
| | Negative (Artificial Graphite) | 80 | 10 | 10 | 0 | | | |
| 129 | Positive (LiFePO$_4$) | 85 | 7 | 6 | 2 | 1 | 167 | 86 |
| | Negative (Artificial Graphite) | 80 | 10 | 10 | 0 | | | |
| 130 | Positive (LiFePO$_4$) | 85 | 5 | 5 | 5 | 1 | 166 | 84 |
| | Negative (Artificial Graphite) | 80 | 10 | 10 | 0 | | | |
| 131 | Positive (LiFePO$_4$) | 85 | 4 | 3 | 8 | 1 | 165 | 84 |
| | Negative (Artificial Graphite) | 80 | 10 | 10 | 0 | | | |
| 132 | Positive (LiFePO$_4$) | 80 | 5 | 5 | 10 | 1 | 166 | 83 |
| | Negative (Artificial Graphite) | 80 | 10 | 10 | 0 | | | |
| 133 | Positive (LiMnPO$_4$) | 85 | 8 | 6.9 | 0.1 | 1 | 150 | 91 |
| | Negative (Artificial Graphite) | 80 | 10 | 10 | 0 | | | |
| 134 | Positive (LiMnPO$_4$) | 85 | 8 | 6.5 | 0.5 | 1 | 150 | 93 |
| | Negative (Artificial Graphite) | 80 | 10 | 10 | 0 | | | |
| 135 | Positive (LiMnPO$_4$) | 85 | 8 | 6 | 1 | 1 | 150 | 92 |
| | Negative (Artificial Graphite) | 80 | 10 | 10 | 0 | | | |

TABLE 4-continued

Effects of fluorophosphate content on battery performance

| Example | Positive/Negative Electrode (Type) | Paste Formulation/Part by Weight | | | | | Capacity per Gram of Primary Period mAh · g$^{-1}$ | Circulation Maintenance Rate/% |
|---|---|---|---|---|---|---|---|---|
| | | Active substance | Conductive Agent | Binder | Fluorophosphate | Electrolyte | | |
| 136 | Positive (LiMnPO$_4$) | 85 | 7 | 6 | 2 | 1 | 149 | 94 |
| | Negative (Artificial Graphite) | 80 | 10 | 10 | 0 | | | |
| 137 | Positive (LiMnPO$_4$) | 85 | 6 | 6 | 3 | 1 | 150 | 95 |
| | Negative (Artificial Graphite) | 80 | 10 | 10 | 0 | | | |
| 138 | Positive (LiMnPO$_4$) | 85 | 5 | 5 | 5 | 1 | 144 | 91 |
| | Negative (Artificial Graphite) | 80 | 10 | 10 | 0 | | | |
| 139 | Positive (LiMnPO$_4$) | 85 | 4 | 3 | 8 | 1 | 137 | 91 |
| | Negative (Artificial Graphite) | 80 | 10 | 10 | 0 | | | |
| 140 | Positive (LiMnPO$_4$) | 80 | 5 | 5 | 10 | 1 | 137 | 90 |
| | Negative (Artificial Graphite) | 80 | 10 | 10 | 0 | | | |

From the results of Table 4, the following conclusions were obtained.

Comparing the comparative example 7, example 23 and examples 91~96, from the viewpoints of initial capacity, circulation maintenance rate and economy, when using the method for preparing battery electrode plate of the present disclosure, the fluorophosphate (lithium difluorophosphate) content of the lithium cobalt oxide electrode plate should be controlled as 2 parts by weight, both the initial capacity and the circulation maintenance rate of battery are relatively good.

Comparing the comparative example 9, example 29 and examples 97~110, from the viewpoints of initial capacity, circulation maintenance rate and economy, when using the method for preparing battery electrode plate of the present disclosure, the fluorophosphate (lithium difluorophosphate) content of the nickel manganese lithium cobalt oxide electrode plate (NCM111) should be controlled as 1 part by weight, and the fluorophosphate (lithium difluorophosphate) content of the NCM622 electrode plate should be controlled as 2 parts by weight, both the initial capacity and the circulation maintenance rate of battery are relatively good.

Comparing the comparative example 13, example 41 and examples 111~125, from the viewpoints of initial capacity, circulation maintenance rate and economy, when using the method for preparing battery electrode plate of the present disclosure, the fluorophosphate (lithium difluorophosphate) content of the nickel-rich manganese lithium cobalt oxide electrode plate should be controlled as 3 parts by weight, both the initial capacity and the circulation maintenance rate of battery are relatively good.

Comparing the comparative example 11, example 35 and examples 126~132, from the viewpoints of initial capacity, circulation maintenance rate and economy, when using the method for preparing battery electrode plate of the present disclosure, the fluorophosphate (lithium difluorophosphate) content of the iron lithium phosphate electrode plate should be controlled as 2 parts by weight, both the initial capacity and the circulation maintenance rate of battery are relatively good.

Comparing the examples 133~140, from the viewpoints of initial capacity, circulation maintenance rate and economy, when using the method for preparing battery electrode plate of the present disclosure, the fluorophosphate (lithium difluorophosphate) content of the lithium manganese phosphate electrode plate should be controlled as 3 parts by weight, both the initial capacity and the circulation maintenance rate of battery are relatively good.

It can be concluded from the results above that the lithium ion secondary battery using the battery electrode plates of the present disclosure have relative good capacity and circulation maintenance rate, and the amount of the added fluorophosphate may be determined according to the type of the positive electrode and the negative electrode.

What is claimed is:

1. A battery electrode plate, comprising a current collector and an electrode paste membrane attaching on the current collector; wherein the electrode paste membrane is formed by the electrode paste comprising a fluorophosphate, the electrode paste membrane comprises an active substance, a conductive agent, a polymer binder and a fluorophosphate; the mass ratio of the active substance, conductive agent, polymer binder and fluorophosphate is (75~97) : (1~10) : (1~10) : (0.1~10); and the fluorophosphate is shown in formula (I):

$$M^{Z+}[PO_xF_y]_Z \quad (I);$$

wherein $M^{Z+}$ is a quaternary onium cation; and x, y and z are all integers, x≥1, y≥1, z≤3, x+y=4, wherein the quaternary onium cation is one selected from the group consisting of quaternary ammonium cations, quaternary phosphonium cations, imidazole cations, pyridine cations, piperidine cations, aniline cations and morpholine cations, and wherein the fluorophosphate is selected from the group consisting of tetraethylammonium difluorophosphate, 1-ethyl-3-methylimidazolium difluorophosphate, 1-butyl-3-methylimidazolium difluorophosphate, N-methylpyridine difluorophosphate, N-butylpyridine difluorophosphate, N-propyl-N-methylpiperidine difluorophosphate, N-butyl-N -methylpiperidine difluorophosphate, N,N,N-triethylaniline difluorophosphate, N,N,N -trimethylaniline difluorophosphate, N,N-dimethylmorpholine difluorophosphate, N-propyl-N -methylmorpholine difluorophosphate, and N-propyl-N-methylmorpholine difluorophosphate.

2. The battery electrode plate according to claim 1, wherein the active substance is a lithium-containing transition metal oxide, transition metal oxide, transition metal sulfide, metal lithium, lithium alloy, lithium titanate material, carbon material, stannic oxide, niobium oxide, vanadium oxide, titanium oxide or silicon.

3. The battery electrode plate according to claim 1, wherein the active substance is a lithium-containing transition metal oxide, transition metal oxide, transition metal sulfide, lithium transition metal phosphate, metal lithium, lithium alloy, lithium titanate material, carbon material, stannic oxide, niobium oxide, vanadium oxide, titanium oxide or silicon.

4. The battery electrode plate according to claim 3, wherein the lithium-containing transition metal oxide is one or more selected from the following formulas 1~6:

$LiCoO_2$, Formula 1; $LiMn_xO_{2x}$, x=1 or 2, Formula 2; $LiNi_{1-x}Mn_xO_2$, 0≤x<1, Formula 3; $LiNi_xCo_{1-x}O_2$, 0<x<1, Formula 4; $LiNi_xMn_yCo_zO_2$, 0≤x,y,z≤1, x+y+z=1, Formula 5; $xLi_2MnO_3$-$(1-x)LiMO_2$, 0≤x≤1, M is Ni, Co or Mn, Formula 6; and the lithium transition metal phosphate is selected from a structure shown in the following Formula 7 and/or Formula 8:

$LiMPO_4$, M is Fe, Co, Mn or Ni, Formula 7; $LiFe_xMn_{(1-x)}PO_4$, 0≤x≤1, Formula 8.

5. The battery electrode plate according to claim 1, wherein the polymer binder is selected from the group consisting of difluoroethylene-hexafluoropropylene copolymer, polyvinylidene difluoride, polyacrylonitrile, polymethyl methacrylate, polytetrafluoroethylene and styrene-butadiene rubber-based polymer, or a mixture thereof.

6. The battery electrode plate according to claim 1, wherein the battery electrode plate has a thickness of 20~500 μm.

7. The battery electrode plate according to claim 1, wherein the battery electrode plate has a thickness of 100~500 μm.

8. A method for preparing a battery electrode plate, comprising:
applying the battery paste according to claim 1 to the current collector, drying and rolling to obtain the battery electrode plate.

9. The method according to claim 8, comprising:
mixing 75~97 parts by weight of active substance, 1~10 parts by weight of conductive agent, 1~10 parts by weight of polymer binder, 0.1~10 parts by weight of fluorophosphate with 100~200 parts by weight of dispersing solvent to obtain the electrode paste;
applying the electrode paste to the current collector, drying and rolling to obtain the battery electrode plate; and
the fluorophosphate is shown in formula (I)

$$M^{Z+}[PO_xF_y]_Z \qquad (I);$$

wherein M is one selected from the elements in group IA, group IIA and group VIII of the periodic table, or $M^{Z+}$ is a quaternary onium cation; and x, y and z are all integers, x≥1, y≥1, z≤3, x+y=4.

10. A lithium ion battery, comprising the battery electrode plate according to claim 1.

11. A lithium ion battery, comprising the battery electrode plate prepared by the method according to claim 8.

* * * * *